United States Patent
Primus et al.

(10) Patent No.: US 9,964,056 B2
(45) Date of Patent: *May 8, 2018

(54) SYSTEM AND METHOD FOR CONTROLLING EXHAUST EMISSIONS AND SPECIFIC FUEL CONSUMPTION OF AN ENGINE

(71) Applicant: GENERAL ELECTRIC COMPANY, Schenectady, NY (US)

(72) Inventors: Roy James Primus, Niskayuna, NY (US); Omowoleola Chukwuemeka Akinyemi, Clifton Park, NY (US); Thomas Michael Lavertu, Clifton Park, NY (US); James Robert Mischler, Girard, PA (US); Venu Gummadavelli Gupta, Fairview, PA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/858,523

(22) Filed: Sep. 18, 2015

(65) Prior Publication Data

US 2016/0010576 A1 Jan. 14, 2016

Related U.S. Application Data

(63) Continuation-in-part of application No. 13/655,764, filed on Oct. 19, 2012, now Pat. No. 9,140,179.

(51) Int. Cl.
*F02D 41/00* (2006.01)
*F02B 37/00* (2006.01)
(Continued)

(52) U.S. Cl.
CPC ........ *F02D 41/0052* (2013.01); *F02B 37/004* (2013.01); *F02B 37/013* (2013.01);
(Continued)

(58) Field of Classification Search
CPC ............. F02D 41/0052; F02D 41/0007; F02D 41/1454; F02D 2200/0406; F02D 41/2422;
(Continued)

(56) References Cited

U.S. PATENT DOCUMENTS 3,900,012 A 8/1975 Wahl et al.
4,213,435 A 7/1980 Simko
(Continued)

FOREIGN PATENT DOCUMENTS

EP 1024263 B1 1/2002

OTHER PUBLICATIONS

H, Wu et al., "Performance Simulation and Control Design for Diesel Engine NOx Emission Reduction Technologies," University of Illinois at Urbana-Campaign, 168 pages, 2011.
(Continued)

*Primary Examiner* — Jason T Newton
(74) *Attorney, Agent, or Firm* — Nitin N. Joshi

(57) ABSTRACT

A method includes controlling an engine speed based on: intake manifold air temperature and/or intake manifold pressure one, or more, of the following data parameters: an engine load as a function of a fuel level, a fuel injecting timing, an intake oxygen concentration, a constituent concentration from the exhaust gas flow, an engine power, and an engine torque. The method also recirculates a portion of the exhaust gas flow to the combustion cylinders of the engine via a recirculation channel, as a function of intake manifold temperature and/or intake manifold pressure at which the engine is operated. An engine system, other
(Continued)

methods, and a non-transitory computer readable medium encoded with a program, to enable a processor-based control unit to control aspects of the engine are also disclosed.

9 Claims, 4 Drawing Sheets

(51) Int. Cl.
| | |
|---|---|
| *F02B 37/013* | (2006.01) |
| *F02B 37/18* | (2006.01) |
| *F02M 26/43* | (2016.01) |
| *F02M 26/05* | (2016.01) |
| *F02M 26/08* | (2016.01) |
| F02B 29/04 | (2006.01) |
| F02D 41/14 | (2006.01) |
| F02D 41/24 | (2006.01) |
| F02M 26/10 | (2016.01) |
| F02M 26/23 | (2016.01) |
| F02M 26/34 | (2016.01) |
| F02M 26/47 | (2016.01) |

(52) U.S. Cl.
CPC .......... *F02B 37/18* (2013.01); *F02D 41/0007* (2013.01); *F02M 26/05* (2016.02); *F02M 26/08* (2016.02); *F02M 26/43* (2016.02); F02B 29/0412 (2013.01); F02B 29/0425 (2013.01); F02B 29/0437 (2013.01); F02D 41/146 (2013.01); F02D 41/1454 (2013.01); F02D 41/1466 (2013.01); F02D 41/2422 (2013.01); F02D 2200/0406 (2013.01); F02D 2200/0414 (2013.01); F02D 2200/703 (2013.01); F02M 26/10 (2016.02); F02M 26/23 (2016.02); F02M 26/34 (2016.02); F02M 26/47 (2016.02); Y02T 10/144 (2013.01); Y02T 10/47 (2013.01)

(58) Field of Classification Search
CPC ............... F02D 41/1466; F02D 41/146; F02D 2200/703; F02D 2200/0414; F02M 26/05; F02M 26/06; F02M 26/08; F02M 26/34; F02M 26/43; F02M 26/47; F02M 26/10; F02M 26/23; F02B 37/18; F02B 37/013; F02B 37/004; F02B 29/0437; F02B 29/0412; F02B 29/0425; Y02T 10/144; Y02T 10/47
USPC ....................................................... 60/605.2
See application file for complete search history.

(56) References Cited

U.S. PATENT DOCUMENTS

| | | | |
|---|---|---|---|
| 5,168,853 A | 12/1992 | Kittelson et al. | |
| 5,901,683 A | 5/1999 | Patel | |
| 6,009,709 A | 1/2000 | Bailey | |
| 6,035,640 A * | 3/2000 | Kolmanovsky | F02B 37/24 123/676 |
| 6,493,627 B1 | 12/2002 | Gallagher et al. | |
| 6,742,506 B1 | 6/2004 | Grandin | |
| 6,899,090 B2 | 5/2005 | Arnold | |
| 6,945,047 B2 | 9/2005 | Shea et al. | |
| 7,055,504 B1 | 6/2006 | Gallagher et al. | |
| 7,066,143 B1 | 6/2006 | Gallagher et al. | |
| 7,246,604 B2 | 7/2007 | Cullen | |
| 7,296,555 B2 | 11/2007 | Tamma et al. | |
| 7,360,523 B2 | 4/2008 | Sloane et al. | |
| 7,444,815 B2 | 11/2008 | Baumgard et al. | |
| 7,565,892 B1 | 7/2009 | Cleary et al. | |
| 7,726,287 B2 | 6/2010 | Sekfane | |
| 8,060,293 B2 | 11/2011 | Mayer et al. | |
| 8,078,384 B2 | 12/2011 | Glugia et al. | |
| 8,307,646 B2 | 11/2012 | Cattani et al. | |
| 8,439,021 B2 | 5/2013 | Vuk | |
| 8,589,002 B1 * | 11/2013 | Henry | F02D 41/40 701/19 |
| 9,140,179 B2 * | 9/2015 | Primus | F02B 37/18 |
| 2002/0112478 A1 | 8/2002 | Pfluger | |
| 2005/0000497 A1 | 1/2005 | Nakai et al. | |
| 2006/0096273 A1 * | 5/2006 | Soliman | F02D 41/1497 60/285 |
| 2006/0162320 A1 | 7/2006 | Surnilla et al. | |
| 2007/0261391 A1 | 11/2007 | Takubo | |
| 2009/0099753 A1 | 4/2009 | Kakeko | |
| 2009/0118973 A1 | 5/2009 | Gillespie et al. | |
| 2009/0199825 A1 | 8/2009 | Piper et al. | |
| 2010/0236532 A1 | 9/2010 | Xiao et al. | |
| 2010/0299049 A1 | 11/2010 | Kang et al. | |
| 2011/0000470 A1 * | 1/2011 | Roth | F02D 13/0249 123/568.11 |
| 2011/0083641 A1 * | 4/2011 | Gokhale | F02D 35/023 123/435 |
| 2011/0131957 A1 | 6/2011 | Hepburn et al. | |
| 2011/0307127 A1 | 12/2011 | Swenson et al. | |
| 2012/0024270 A1 * | 2/2012 | Wang | F02D 41/0007 123/568.21 |
| 2012/0055457 A1 | 3/2012 | Wong et al. | |
| 2012/0234303 A1 | 9/2012 | Born et al. | |
| 2012/0325187 A1 * | 12/2012 | Sankar | F02D 41/0065 123/568.21 |
| 2013/0030672 A1 * | 1/2013 | Klingbeil | F02D 41/0085 701/109 |
| 2014/0109571 A1 * | 4/2014 | Primus | F02B 37/18 60/605.2 |
| 2016/0115883 A1 * | 4/2016 | Mischler | F02D 41/0072 123/703 |

OTHER PUBLICATIONS

Z. Stelmasiak et al. "Some Aspects of Control Charge Quality in a Dual Fuel Diesel Engine Fuelled With Cng and Diesel Oil," Journal of KONES Internal Combustion Engines, 2004, vol. 11, No. 3-4, pp. 226-233.

* cited by examiner

SYSTEM AND METHOD FOR CONTROLLING EXHAUST EMISSIONS AND SPECIFIC FUEL CONSUMPTION OF AN ENGINE

CROSS REFERENCE TO RELATED APPLICATIONS

This Continuation-In-Part (C.I.P.) application claims priority to the Oct. 19, 2012 filing date of U.S. application Ser. No. 13/655,764 (Entitled: SYSTEM AND METHOD FOR CONTROLLING EXHAUST EMISSIONS AND SPECIFIC FUEL CONSUMPTION OF AN ENGINE). This C.I.P. application also claims priority to the Dec. 23, 2013 filing date of U.S. application Ser. No. 14/138,200 (Entitled: SYSTEM AND METHOD FOR CONTROLLING A DUAL FUEL ENGINE). The contents of both are incorporated herein by reference in their entirety.

BACKGROUND

The embodiments of the present invention relate generally to a system and method of operating an engine and, more specifically, to a system and method for controlling exhaust emissions and specific fuel consumption of an engine. Compression-ignition engines, such as diesel engines, operate by directly injecting a fuel (e.g., diesel fuel) into compressed air in one or more piston-cylinder assemblies, such that the heat of the compressed air ignites the fuel-air mixture. Compression-ignition engines may also include a glow plug to provide heat to ensure ignition. The direct fuel injection atomizes the fuel into droplets, which evaporate and mix with the compressed air in the combustion chambers of the piston-cylinder assemblies. Typically, compression-ignition engines operate at a relatively higher compression ratio than spark ignition engines. The compression ratio directly affects the engine performance, efficiency, exhaust pollutants, and other engine characteristics. In addition, the fuel-air ratio affects engine performance, efficiency, exhaust pollutants, and other engine characteristics. Exhaust emissions generally include pollutants such as carbon oxides (e.g., carbon monoxide), nitrogen oxides ($NO_x$), sulfur oxides ($SO_x$), particulate matter (PM), and smoke. The amount and relative proportion of these pollutants varies according to the fuel-air mixture, compression ratio, injection timing, environmental conditions (e.g., atmospheric pressure, temperature, etc.), and the like.

In certain applications, the compression-ignition engines are used in relatively extreme environmental conditions, such as high altitudes, particularly in mountainous regions. These environmental conditions can adversely affect engine performance, efficiency, exhaust pollutants, and other engine characteristics. For example, diesel engines operating in mountainous regions are subject to greater loads, lower atmospheric pressures due to higher altitudes, lower temperatures due to colder climate or higher altitude, lower air density due to lower atmospheric pressure, and the like.

The various engine parameters are particularly susceptible to exceed engine design limits when the engine is operating at a full load at extreme ambient temperature and altitude conditions. It is difficult to adequately account for the impact of ambient conditions to control exhaust emissions and specific fuel consumption of the engine to specific limits.

An enhanced technique for controlling exhaust emissions and specific fuel consumption of an engine is desired.

BRIEF DESCRIPTION

In accordance with one exemplary embodiment of the present invention, a method is disclosed. The method comprises controlling an engine speed based on: at least one of: intake manifold air temperature and intake manifold pressure; and at least one data parameter of: an engine load as a function of a fuel level, a fuel injecting timing, an intake oxygen concentration, a constituent concentration in at least a portion of an exhaust gas flow, an engine power, and an engine torque; and recirculating at least a portion of the exhaust gas flow to a plurality of combustion cylinder of the engine via a recirculation channel, as a function of at least one of the intake manifold temperature and intake manifold pressure at which the engine is operated.

In accordance with another exemplary embodiment of the present invention, an engine system is disclosed. The engine system comprises: an engine comprising a plurality of combustion cylinders; a turbine coupled to the engine, and configured to expand a first portion of an exhaust gas generated from the plurality of combustion cylinders; a recirculation channel for recirculating a third portion of the exhaust gas to the plurality of combustion cylinders, as a function of at least one of intake manifold temperature and intake manifold pressure at which the engine operates; and a controller configured to control engine speed based on: at least one of: intake manifold air temperature and intake manifold pressure; and at least one data parameter of: an engine load as a function of a fuel level, a fuel injecting timing, an intake oxygen concentration, a constituent concentration in at least a portion of an exhaust gas flow, an engine power, and an engine torque.

In accordance with another exemplary embodiment of the present invention, a non-transitory computer readable medium encoded with a program for a processor-based control unit is disclosed. The non-transitory computer readable medium encoded with a program, to enable a processor-based control unit to: control at least one of: at least one of: intake manifold air temperature and intake manifold pressure; and at least one data parameter of: an engine load as a function of a fuel level, a fuel injecting timing, an intake oxygen concentration, a constituent concentration in at least a portion of an exhaust gas flow, an engine power, and an engine torque.

In accordance with another exemplary embodiment of the present invention, a method comprises: maintaining for an operating engine one of: specific fuel consumption (SFC) within a predefined SFC limit for the operating engine; and an exhaust emission within a predefined emission limit for the operating engine by controlling one of: adjusting a power to a compressor; and recirculating a third portion of the exhaust gas to a plurality of combustion cylinders via a recirculation channel, as a function of an intake manifold air temperature and pressure at which the engine is operated.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The term "Tier 4" or "Tier 4 standards" means the Tier 4 Line Haul Locomotive Emissions Standards as promulgated by the United States Environmental Protection Agency (EPA). The Tier 4 standards are codified at 40 CFR Part 1033, while the de facto standards and Tables are found specifically at 40 CFR 1033.101. Tier 4 standards can also be found at http://www.ecfr.gov/cgi-bin/text-idx?SID=c96b8ff349cc19252400485a86e87e99&mc=true&node=se40.33.1033_1101&rgn=div8. The Tier 4 standards are incorporated herein by reference in their entirety.

Figure 1:
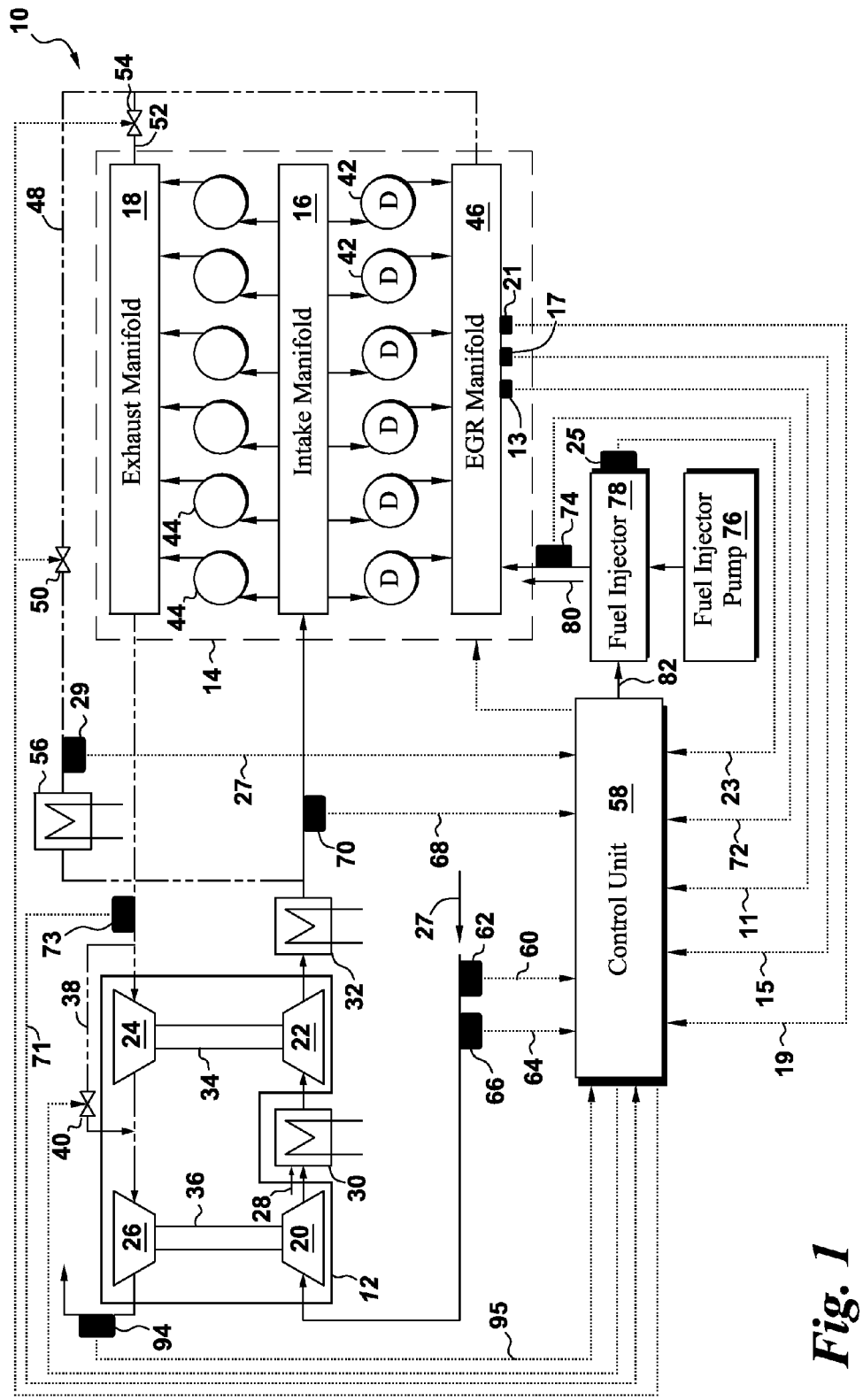
FIG. 1 is a diagrammatical representation of a system in accordance with an exemplary embodiment of the present invention.

Referring to FIG. 1, a turbocharged unit 10 having exhaust emission and specific fuel consumption (SFC) control features, is illustrated in accordance with certain embodiments of the present invention. The turbocharged unit 10 includes a turbo-charger 12 and a compression-ignition engine, e.g., a diesel engine 14. A motor-generator unit (not shown) may be mechanically coupled to the diesel engine 14. As discussed in further detail below, embodiments of the present invention provide monitoring and control features, such as sensors and control logic, for maintaining a SFC of the engine 14 and a quantity of exhaust emissions in the exhaust gas, within a predefined SFC limit and an emission limit respectively, by controlling feed of a portion of the exhaust gas bypassing a turbine and/or recirculating a portion of the exhaust gas to the engine 14, as a function of ambient conditions such an intake manifold air temperature and pressure at which the engine 14 is operated. In certain embodiments, fuel injection timing and/or engine speed may also be controlled as a function of ambient conditions.

The illustrated engine 14 includes an air intake manifold 16 and an exhaust manifold 18. The turbo-charger 12 includes a first-stage compressor 20, a second-stage compressor 22, a first-stage turbine 24, and a second-stage turbine 26. Ambient air 27 may be drawn through a filter (not shown) and then compressed to a higher pressure via the first-stage compressor 20. The temperature of air is increased due to compression. The compressed intake air 28 is cooled via an intercooler 30, and then further compressed to a further higher pressure via the second-stage compressor 22. The compressed air is then cooled via another intercooler 32 and then supplied to the intake manifold 16 for combustion within the engine 14. The compressed air flows through the intercooler 32 such that the temperature of air is reduced prior to delivery into the intake manifold 16 of the engine 14. In one embodiment, the intercoolers 30, 32 may be air-to-water heat exchangers, which utilize a coolant to facilitate removal of heat from the compressed air. In another embodiment, the intercoolers 30, 32 may be air-to-air heat exchangers, which utilize ambient air to facilitate removal of heat from compressed air. In yet another embodiment, the intercoolers 30, 32 may be a hybrid cooler arrangement that utilizes both air-to-water and air-to-air heat exchangers.

The first-stage turbine 24 is coupled to the exhaust manifold 18 for extracting energy from exhaust gases for rotating a turbocharger shaft 34 coupled to the second-stage compressor 22. The second-stage turbine 26 is coupled to the first-stage turbine 24 for extracting energy from expanded gases fed from the first stage turbine 24, for rotating a turbocharger shaft 36 coupled to the first-stage compressor 20. The expanded gases from the second-stage turbine 26 may be ejected to the atmosphere.

In the illustrated embodiment, an exhaust channel 38 is disposed bypassing the first-stage turbine 24. A bypass control valve 40 is provided to the exhaust channel 38 to control flow through the exhaust channel 38. In some embodiments, all of the exhaust gas from the exhaust manifold 18 is expanded through the first-stage turbine 24. In certain other embodiments, a first portion of the exhaust gas from the exhaust manifold 18 is expanded through the first-stage turbine 24 and a remaining portion (also referred to as "a second portion") of the exhaust gas from the exhaust manifold 18 is fed through the exhaust channel 38 bypassing the first-stage turbine 24. The second portion of the exhaust gas fed through the channel 38 is expanded via the second-stage turbine 26.

The engine 14 includes a plurality of combustion cylinders 42, 44. A first set of cylinders 42 may be referred to as "donor cylinders" (labelled "D" therein) and the other set of cylinders 44 may be referred to as "non-donor cylinders". In the illustrated embodiment, the engine 14 includes six donor cylinders 42 and six non-donor cylinders 44. A piston (not shown) is slidably disposed in each cylinder 42, 44 and reciprocates between a top dead center and a bottom dead center position. It should be noted herein that the number of cylinders may vary depending upon the application. The combustion cylinders 42, 44 are coupled to the intake manifold 16 and receive compressed air via the intake manifold 16.

In the illustrated embodiment, the non-donor cylinders 44 are coupled to the exhaust manifold 18. The exhaust gas from the non-donor cylinders 44 are fed via the exhaust manifold 18 to the first-stage turbine 24 and/or the exhaust channel 38. The donor cylinders 42 are coupled to an exhaust gas recirculation manifold 46.

A first recirculation control valve 50 is provided to control flow through the recirculation channel 48. The exhaust gas recirculation manifold 46 is coupled to the intake manifold 16 via a recirculation channel 48. The exhaust gas from the donor cylinders 42 (also referred to as "a third portion of exhaust gas") is fed via the exhaust gas recirculation manifold 46 to the intake manifold 16. In the illustrated embodiment, the recirculation channel 48 is coupled to the exhaust manifold 18 via an exit channel 52. A second recirculation control valve 54 is provided to control flow from the recirculation channel 48 to the exhaust manifold 18. In some embodiments, the entire exhaust gas from the donor cylinders 42 is fed via the exhaust gas recirculation manifold 46, the exhaust gas recirculation channel 48 to the intake manifold 16. In certain embodiments, a portion of the exhaust gas from the donor cylinders 42 is fed via the recirculation channel 48, the exit channel 52 to the exhaust manifold 18. A recirculation cooler 56 is provided to the recirculation channel 48. The recirculation cooler 56 cools the exhaust gas fed through the recirculation channel 48, prior to feeding to the plurality of combustion cylinders 42, 44 via the intake manifold 16.

The turbocharged unit 10 also includes a control unit 58. In the illustrated embodiment, the control unit 58 is an electronic control unit for the turbocharger 12 and the engine 14. In another embodiment, the control unit 58 is an electronic logic control unit that is programmable by a user. The control unit 58 receives a pressure signal 60 from a pressure sensor 62 provided to detect pressure of intake air fed to the engine 14. Additionally, the control unit 58 receives a temperature signal 64 from a temperature sensor 66 provided to detect temperature of intake air fed to the engine 14. The control unit 58 may also receive an oxygen signal 68 from an oxygen sensor 70 provided to detect quantity of oxygen in the intake air fed to the intake manifold 16. In some embodiments, the control unit 58 may also receive an oxygen signal 71 from another oxygen sensor 73 provided to detect quantity of oxygen from the exhaust gas fed from the exhaust manifold 18. Further, the control unit 58 may also receive a mass flow signal 72 from a fuel sensor 74 provided to detect mass flow of a fuel fed to the engine 14. The control unit 58 may also receive a speed signal 11 from a speed sensor 13, a notch signal 15 from a notch sensor 17, a load signal 19 from a load sensor 21, a fuel injection timing signal 23 from an injection timing sensor 25, a soot signal 95 from a soot sensor 94, and an exhaust gas recirculation mass flow signal 27 from a mass flow sensor 29. In the illustrated embodiment, a fuel injector pump 76 drives a plurality of fuel injectors 78 for injecting a fuel 80 into a plurality of cylinders 42, 44 of the engine 14. The soot sensor 94 may be located along the exhaust gas path.

In accordance with embodiments of the present invention, the control unit 58 receives the signals 11, 15, 19, 23, 27, 60, 64, 68, 71, 72, 95 and controls the bypass control valve 40, and the first and second recirculation control valves 50, 54 based on the signals 11, 15, 19, 23, 27, 60, 64, 68, 71, 72, 95 so as to control quantity of exhaust gas bypassing the first-stage turbine 24 and recirculated through the recirculation channel 48. In certain other embodiments, the control unit 58 may additionally control the engine speed and/or fuel mass flow by producing a timing signal 82 to control operation of the fuel injectors 78.

As discussed herein, in certain applications, the compression-ignition engines are used in relatively extreme environmental conditions, such as high altitudes. These environmental conditions can adversely affect engine performance, efficiency, exhaust pollutants, and other engine characteristics. Conventional engines do not adequately account for impact of ambient conditions to control exhaust emissions and specific fuel consumption of the engine to specific limits.

In accordance with the embodiments of the present invention, air-fuel ratio and quantity of exhaust gas recirculation are varied in response to changes in ambient conditions such as intake manifold air temperature and pressure. In other words, set points of the air-fuel ratio and quantity of exhaust gas recirculation are varied in response to changes in intake manifold air temperature and pressure. The use of variable points of the air-fuel ratio and quantity of exhaust gas recirculation in response to ambient conditions, in conjunction with a corresponding fuel injection strategy and control of engine speed, facilitates maintaining SFC and exhaust emission such as $NO_x$ and particulate matter (PM) within specified limits.

Typically, when an engine is at a higher altitude region or a high temperature region, the airflow delivered to such an engine decreases. Under such a condition, it is required to either maintain the airflow at a required rate or operate at lower airflow rate while still maintaining SFC and emissions within specified limits. In certain such exemplary embodiments of the present invention, the control unit 58 facilitates to increase a quantity of intake air flow to the plurality of combustion cylinders 42, 44 by decreasing feed of the exhaust gas from the exhaust manifold 18 via the exhaust channel 38 bypassing the turbine 24, as a function of the intake manifold air temperature and pressure at which the engine 14 is operated, and vice versa so as maintain a desired air-fuel ratio. In other words, the opening of the bypass control valve 40 is reduced to decrease the flow of exhaust gas through the channel 38 so as to increase airflow to the engine cylinders 42, 44. When the opening of the valve 40 is increased, airflow to the cylinders 42, 44 is reduced.

In some embodiments, to maintain airflow at a predefined rate with increasing altitude, the valve 40 is opened at sea-level operating conditions and closed at a high altitude operating conditions. In certain other embodiments, at high altitude operating conditions, the airflow to the cylinders 42, 44 may be reduced by increasing quantity of exhaust gas recirculation flow through the recirculation channel 48 by controlling opening of the first and second recirculation control valves 50, 54. As mentioned above, the quantity of exhaust gas recirculation flow via the channel 48 to the intake manifold 16 may be reduced by diverting a portion of exhaust gas flow from the channel 48 to the exhaust manifold 18 via the exit channel 52. When the EGR rate is increased, airflow to the cylinders 42, 44 is decreased, and vice versa. Further, the control unit 58 may increase engine speed as a function of ambient conditions, to increase airflow to the cylinders 42, 44. Further, the control unit 58 may change the fuel injection timing as a function of the engine ambient conditions. The control of turbine bypass flow and EGR flow is optimized in conjunction with optimized fuel injection strategy and engine speed, as a function of intake manifold air temperature and pressure, to maintaining a specific fuel consumption (SFC) of the engine and a quantity of exhaust emissions in the exhaust gas, within a predefined SFC limit and an emission limit respectively. It should be noted herein that quantity of oxygen in the intake air flow is dependent on the air-fuel ratio and EGR flow rate.

Figure 2:
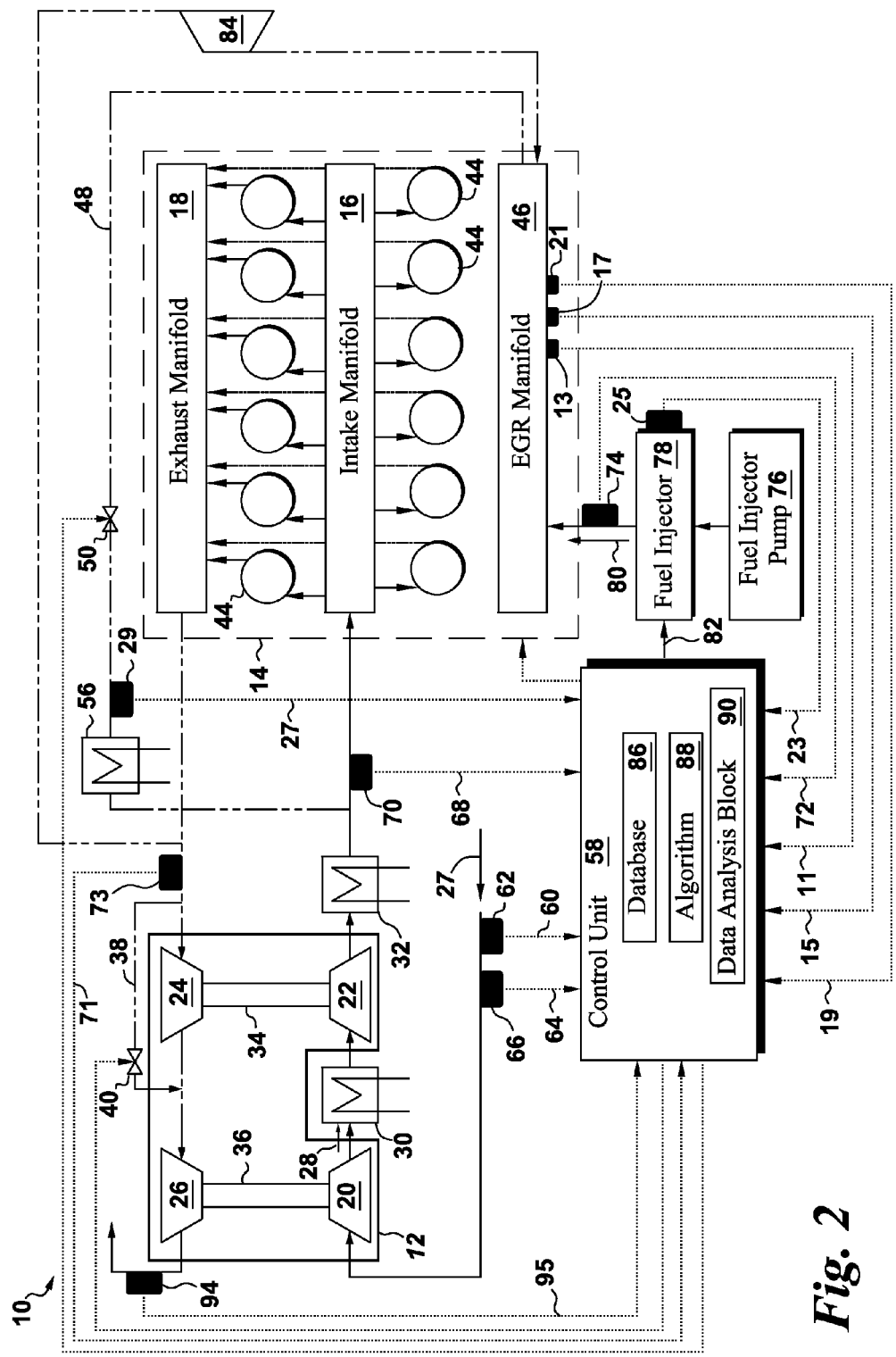
FIG. 2 is a diagrammatical representation of a system in accordance with another exemplary embodiment of the present invention.

Referring to FIG. 2, the turbocharged unit 10 is illustrated in accordance with a particular embodiment of the present invention. Features and aspects of the embodiment illustrated in FIG. 2 are similar to those depicted in the embodiment shown in FIG. 1. The turbocharged unit 10 includes an exhaust compressor 84 coupled to the exhaust manifold 18 and the exhaust gas recirculation manifold 46. The exhaust compressor 84 receives a portion of the exhaust gas from the exhaust manifold 18 and compresses the portion of the exhaust gas, prior to feeding the portion of the exhaust gas via the EGR manifold 46, the recirculation channel 48 to the plurality of the combustion cylinders 44. In other words, the exhaust compressor 84 operates, or functions, as an "EGR pump" in lieu of having dedicated donor cylinders. The EGR pump (e.g., exhaust compressor 84) may be controlled, for example, by control valves (not shown) and/or via controlling power (not shown) supplied to the EGR pump.

In the illustrated embodiment, all of the exhaust gas from all of the cylinders 44 is fed to the exhaust gas manifold 18, and subsequently a portion of the exhaust gas is fed from the exhaust gas manifold 18 to the intake manifold 16 via the exhaust gas recirculation manifold 46, and the exhaust gas recirculation channel 48. Compared to the embodiment of FIG. 1, there is no exit channel 52 between the exhaust gas recirculation channel 48 and the exhaust manifold 18.

The control unit 58 may further include a database 86, an algorithm 88, and a data analysis block 90. The database 86 may be configured to store predefined information associated with the turbocharger 12 and the engine 14. For example, the database 86 may store information relating to temperature, and pressure of the intake air, quantity of oxygen in the intake air, fuel injection timing, engine speed, fuel mass flow, or the like. Furthermore, the database 86 may be configured to store actual sensed/detected information from the above-mentioned sensors 13, 17, 21, 25, 29, 62, 66, 70, 73, 74, and 94. The algorithm 88 facilitates the processing of signals from the above-mentioned plurality of sensors 13, 17, 21, 25, 29, 62, 66, 70, 73, 74, and 95.

The data analysis block 90 may include a range of circuitry types, such as a microprocessor, a programmable logic controller, a logic module, and the like. The data analysis block 90 in combination with the algorithm(s) 88 may be used to perform the various computational operations relating to maintaining specific fuel consumption (SFC) of the engine and a quantity of exhaust emissions in the exhaust gas, within a predefined SFC limit and an emission limit respectively. The control unit 58 is operable to control the feed of a portion of the exhaust gas via the exhaust channel 38 bypassing the turbine 24; recirculation of a portion of the exhaust gas to the plurality of combustion cylinders 44 via the recirculation channel 48, as a function of an intake manifold air temperature and pressure at which the engine 14 is operated.

Figure 3:
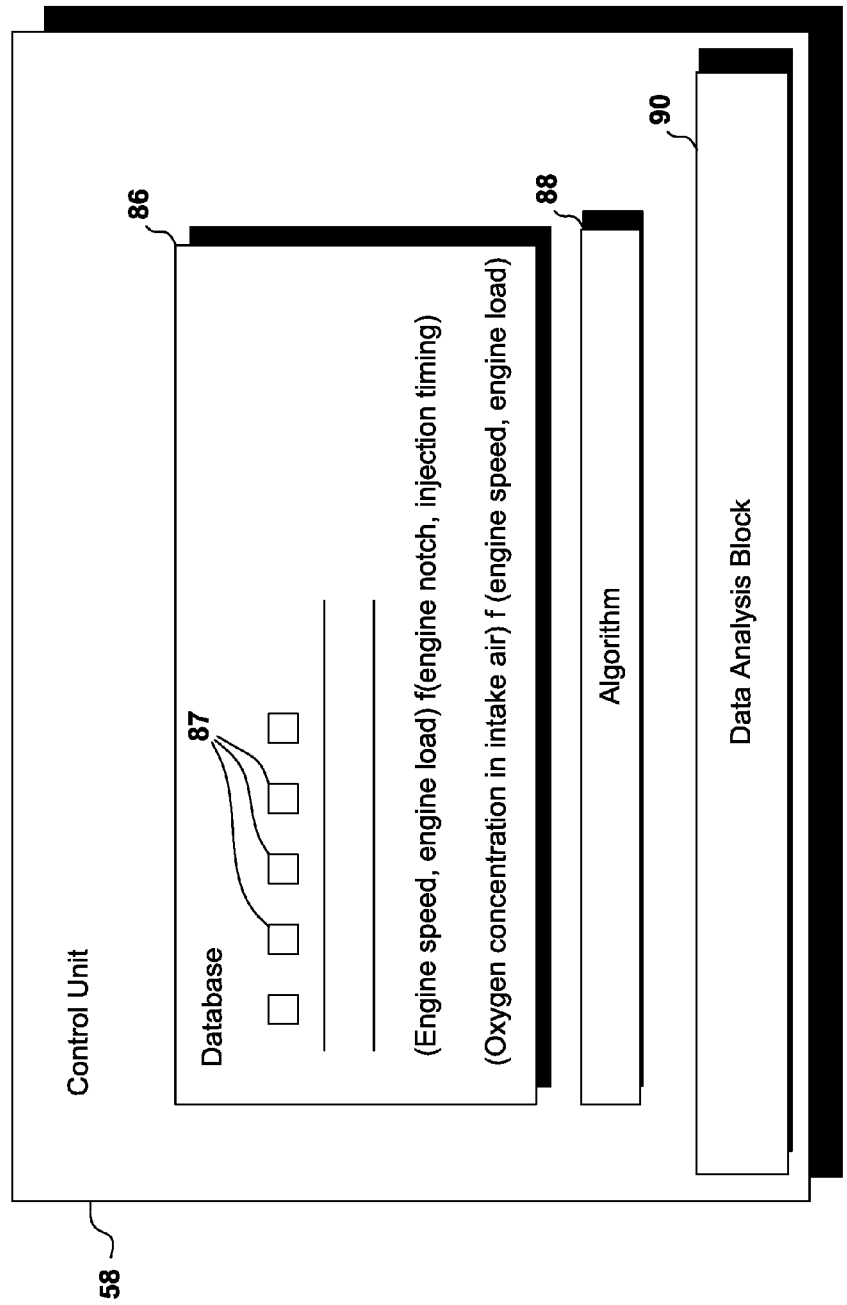
FIG. 3 is a diagrammatical representation of a control unit of the system in accordance with the embodiment of FIG. 2.

Referring to FIG. 3, the control unit 58 is illustrated in accordance with a particular embodiment of the present invention. In the illustrated embodiment, the database 86 includes a plurality of maps 87, wherein each map 87 is representative of a data comprising an engine speed, and an engine load as a function of an engine notch, a fuel injecting timing, and an oxygen concentration in an intake air flow as a function of the engine speed, and the engine load. In certain embodiments, the control unit 58 controlling at least one of the engine speed, the engine load, the oxygen concentration in the intake air flow, the fuel injection timing based on a selected map 87. The map 87 may be selected based on ambient conditions (intake manifold air temperature and pressure) at which the engine is operated. In some embodiments, the control unit 58 controls the valves 50, 54 (shown in FIG. 1) to control the recirculation of the exhaust gas to the plurality of combustion cylinders via the recirculation channel, thereby controlling the oxygen concentration in the intake air flow. In certain other embodiments, the control unit 58 controls at least one of an oxygen concentration in the intake air flow, a fuel injection timing based on the intake manifold air temperature detected by the temperature sensor.

Alternatively to, or concurrently with, using look up tables and maps, the control unit 58 may use model-based or transfer functions calculations to control how the engine is operated.

Figure 4:
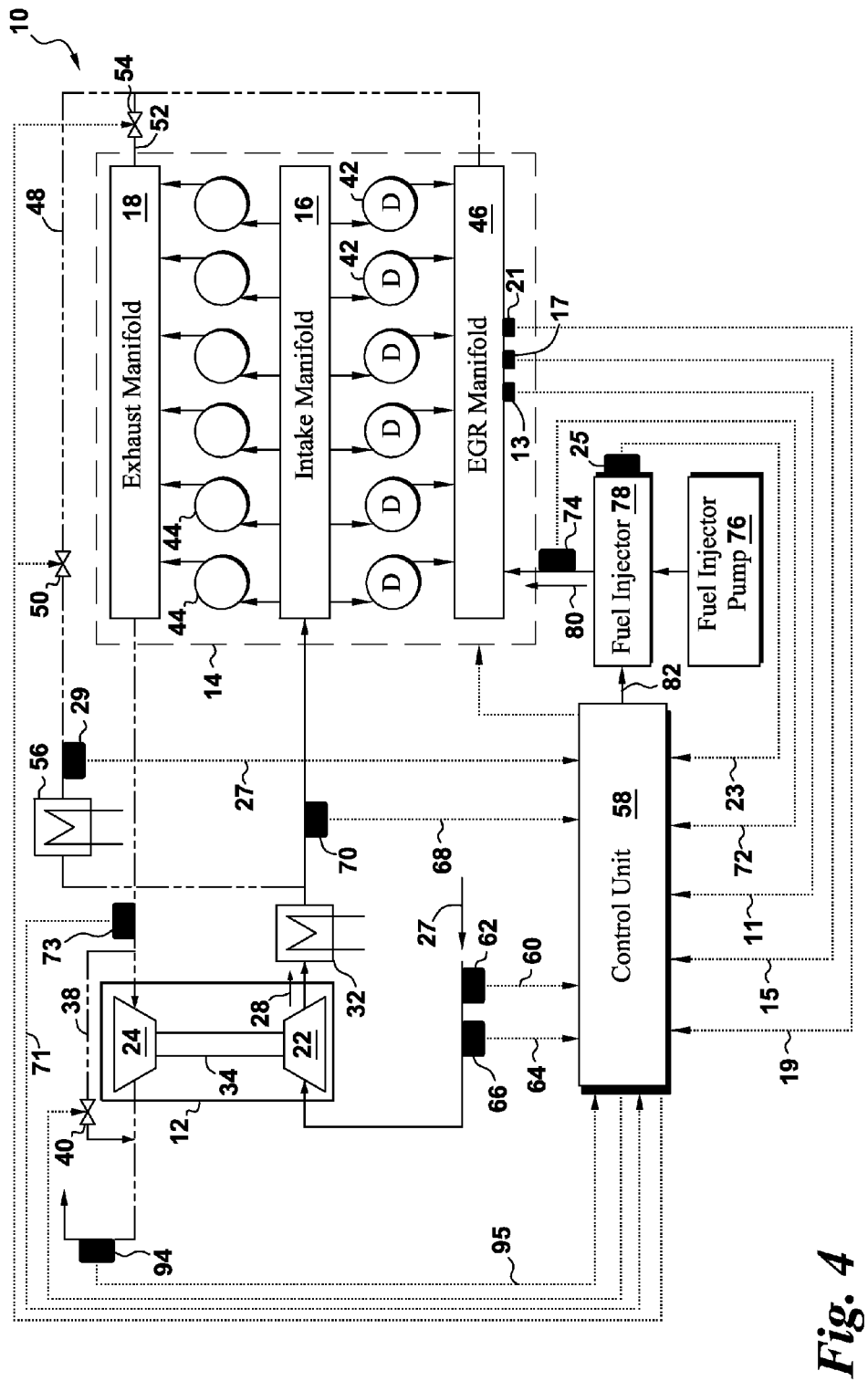
FIG. 4 is a diagrammatical representation of a system in accordance with another exemplary embodiment of the present invention.

Referring to FIG. 4, a turbocharged unit 10 is illustrated in accordance with a particular embodiment of the present invention. Aspects of the illustrated embodiment are similar to the embodiment of FIG. 1, except that the turbocharger 12 has only a single stage compressor 22 and a single stage turbine 24. As discussed herein, intake air 28 may be drawn through a filter (not shown) and then compressed to a higher pressure via the single stage compressor 22. The compressed intake air 28 is cooled via the intercooler 32, and then supplied to the intake manifold 16 for combustion within the engine 14. The single stage turbine 24 is coupled to the exhaust manifold 18 for extracting energy from exhaust gases for rotating a turbocharger shaft 34 coupled to the single stage compressor 22. The expanded gases from the single stage turbine 24 may be ejected to the atmosphere. It should be noted herein that although specific configurations of the turbocharged unit 10 having turbine bypass and EGR features have been shown in FIGS. 1-4, it should not be construed as limiting the scope of the invention. Specific features of the turbocharged unit 10 may vary depending upon the application.

In accordance with the embodiments of the present invention, the SFC and exhaust emissions of the engine 14 are maintained within specific limits over a range of ambient conditions. Different set points of different air-to-fuel-ratio and exhaust gas recirculation levels determined as a function of ambient conditions facilitates to maintain the $NO_x$ and PM levels within specific limits. The specific limits may be predefined limits including, for example, Tier 4 standards.

In accordance with embodiments of the present invention, the engine 14 when operated under methods herein meets, or exceeds, the Tier 4 standards. Further, as depicted for example in FIGS. 1, 2, and 4, various embodiments meet or exceed Tier 4 standards without the need for any aftertreatment systems on the engine 14 and/or turbocharged units 10. That is various turbocharged units 10, as shown in FIGS. 1-4, meet, or exceed, Tier 4 in the absence of any aftertreatment systems (e.g., filters, Selective Catalytic Reduction (SCR), urea, etc.). Optionally, aftertreatment systems may be additionally be used.

Although the embodiments depicted in FIGS. 1, 2 and 4 illustrate an exhaust channel 38 for feeding another portion of the exhaust gas bypassing the first stage turbine 24, other embodiments are available. That is other embodiments are possible that so too adjust or control power to the compressor 22. For example, a variable geometry turbine casing can be used to adjust power to turbocharger shaft 34 to the compressor 22.

The turbocharger 12 embodiments illustrated depict single stage (see e.g., FIG. 4) and dual stage (see e.g., FIGS. 1 and 2). Other combinations of stages and quantity of turbine/compressor per stage, may be used in the turbocharger 12. By example, and not by limitation, the second stage turbine 26 may be instead two turbines (not shown), the first state compressor 20 may be two compressors (not shown).

The turbocharged unit 10 may be used in a variety of applications including stationary and mobile applications. By example, and not limitation, the turbocharged unit 10 may be used in rail (e.g., locomotive) and marine applications. With rail applications, for example, the turbocharged unit 10 may be used as a source or mechanical energy for a diesel electric locomotive; thereby, allowing for engine speed to be decoupled from the vehicle speed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   controlling an engine speed based on:
      at least one of: intake manifold air temperature and intake manifold pressure; and
      at least one data parameter of: an engine load as a function of an engine notch, a fuel injecting timing, an intake oxygen concentration, a constituent concentration in at least a portion of an exhaust gas flow, an engine power, and an engine torque; and
   recirculating at least a portion of the exhaust gas flow to a plurality of combustion cylinder of the engine via a recirculation channel, as a function of at least one of the intake manifold temperature and intake manifold pressure at which the engine is operated.

2. The method of claim 1, further comprising selectively bypassing a turbine feeding at least a portion of the exhaust gas flow via an exhaust channel.

3. The method of claim 1, wherein a fuel level of the engine comprises a notch setting.

4. The method of claim 1, wherein the constituent concentration comprises at least one of: NOR, an exhaust oxygen content, and soot content.

5. The method of claim 1, wherein the at least one data parameter is disposed in at least one map, and further comprising:
   selecting a map from a plurality of maps based on at least one of: intake manifold air temperature, intake manifold air pressure, engine speed, engine load, ambient temperature, and altitude.

6. An engine system comprising:
   an engine comprising a plurality of combustion cylinders;
   a turbine coupled to the engine, and configured to expand a first portion of an exhaust gas generated from the plurality of combustion cylinders;
   a recirculation channel for recirculating a third portion of the exhaust gas to the plurality of combustion cylinders, as a function of at least one of intake manifold temperature and intake manifold pressure at which the engine operates; and
   a controller configured to control engine speed based on:
      at least one of: intake manifold air temperature and intake manifold pressure; and
      at least one data parameter of: an engine load as a function of an engine notch, a fuel injecting timing, an intake oxygen concentration, a constituent concentration in at least a portion of an exhaust gas flow, an engine power, and an engine torque.

7. The engine system of claim 6, further comprising an exhaust channel for feeding a second portion of the exhaust gas bypassing the turbine.

8. The engine system of claim 6, wherein a fuel level comprises a notch setting.

9. The engine system of claim 6, wherein the engine system has no aftertreatment system.

\* \* \* \* \*